(No Model.)
W. R. WILCOX.
WHEEL TIRE.
No. 476,714. Patented June 7, 1892.
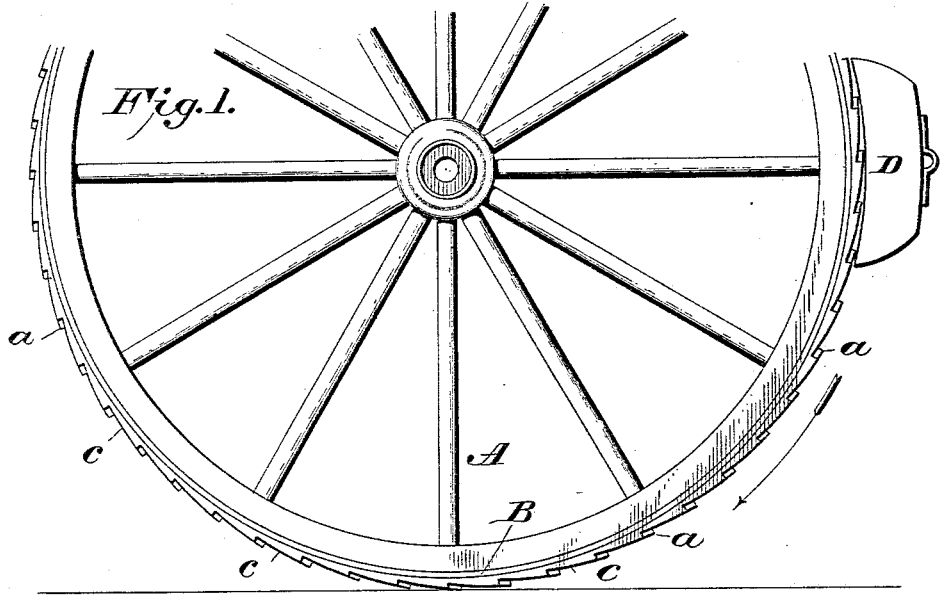
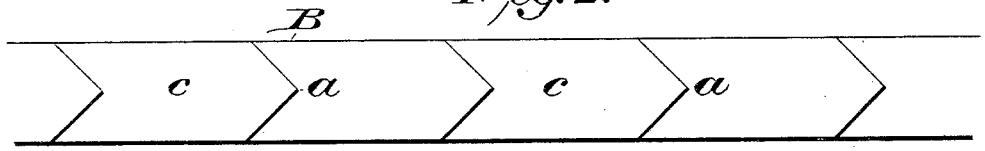
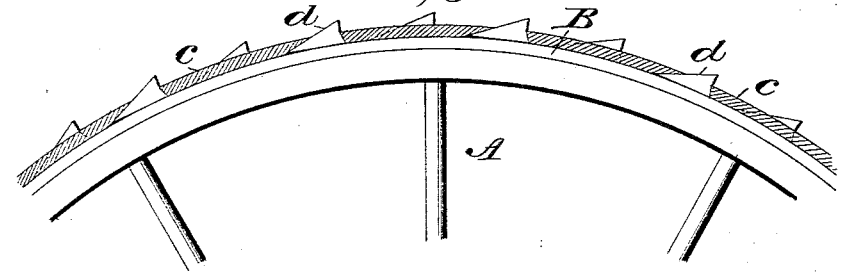
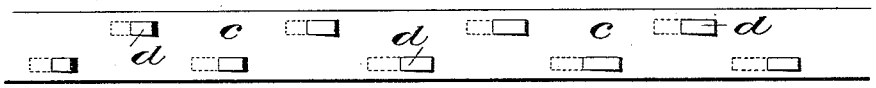
William R. Wilcox.
Inventor
Witnesses
by
Attorney

UNITED STATES PATENT OFFICE.

WILLIAM R. WILCOX, OF RIDGWAY, COLORADO.

WHEEL-TIRE.

SPECIFICATION forming part of Letters Patent No. 476,714, dated June 7, 1892.

Application filed November 19, 1891. Serial No. 412,397. (No model.)

*To all whom it may concern:*

Be it known that I, WILLIAM R. WILCOX, a citizen of the United States of America, residing at Ridgway, in the county of Ouray and State of Colorado, have invented certain new and useful Improvements in Wagon-Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in tires for the wheels of vehicles.

The object of the invention is to provide a tire with teeth adapted to better grasp the road-bed when slippery or covered with ice, such a tire being adapted to be applied over the ordinary tire; and the invention consists in the combination, with a vehicle-wheel, of a tire having inclined projections on the face of the same, as will be hereinafter fully set forth, and particularly pointed out in the claims.

In the accompanying drawings, forming part of this specification, Figure 1 is a side view of a vehicle-wheel, showing my improved tire applied thereto. Fig. 2 is a plan view. Fig. 3 is a modification of my invention partly in section. Fig. 4 is a plan view of the modification.

A refers to the vehicle-wheel, and B to the ordinary flat tire which binds the periphery thereof.

C designates my improved tire, which is preferably secured above the ordinary tire. This supplemental tire is provided with inclined projections $a$, which are formed after the manner of ratchet-teeth, the ends of which are brought to a point, as shown, and extend in the line of draft at the point of contact with the ground. It will be noted that the direction of the teeth is such that they will not cut into the ground when the wheel revolves and will move freely over the brake-block to permit it to act in the usual manner. When the brake-block is applied to stop the wheel on a downgrade, the teeth will enter the ice or slippery surface to prevent the wheel sliding.

In Fig. 3 of the drawings the tire C is shown provided with alternating apertures, the front and rear walls of which are oppositely inclined at angles of different degrees, so as to receive and retain therein wedge-shaped blocks $d$, which are positioned before the tire C is placed upon the tire B. These blocks are reversible.

It is obvious that the tire hereinbefore described is very effective in winter, when the road is liable to be covered with ice, and will prevent the wheel from sliding when the brake is applied. When the wheel revolves, the projections being so small with respect to the periphery of the wheel, there will be no appreciable jar to the body of the vehicle.

I am aware that prior to my invention it has been proposed to recess or notch the sides of vehicle-tires, so that they can better grasp the rails of tramways to more readily turn the same from between the tracks. My improvement is designed for a different purpose and is not adapted for such use.

Having thus described my invention, what I claim as new, and desire to secure by Letters Patent, is—

1. In combination with a vehicle-wheel, a tire having ratchet-teeth which incline forwardly at the base of the wheel, the points of which are adapted to engage with the roadway when the wheel is locked by a brake, substantially as set forth.

2. In combination with a vehicle-wheel, a tire having recesses for the reception of projecting ratchet-teeth, said tire being secured over a plain tire, substantially as set forth.

3. In combination with a vehicle-wheel, a tire C, having apertures, and reversible blocks $d$, retained within said apertures, substantially as set forth.

4. In combination with a vehicle-wheel, a tire C, having apertures, the front and rear walls of which are oppositely inclined at different angles, and wedge-shaped blocks $d$, adapted to be reversibly secured within said apertures, substantially as set forth.

5. In combination with a vehicle-wheel having an ordinary tire secured over the felly or rim thereof, a supplemental tire secured over the plain tire, said supplemental tire having on its outer face inclined or raised portions forming ratchet-teeth, the projecting portions thereof being adapted to engage and dig or plow into the ground when the wheel is locked against rotation, the points of said ratchet-teeth contacting with the road-bed or ground first, and a brake-block B, adapted to engage with the supplemental tire and bear upon the highest portions of said ratchet-teeth, substantially as shown, and for the purpose set forth.

In testimony whereof I affix my signature in presence of two witnesses.

WILLIAM R. WILCOX.

Witnesses:
W. L. O. HOBSON,
A. H. WARD.